United States Patent [19]

Norlin

[11] 4,440,435
[45] Apr. 3, 1984

[54] MOTOR VEHICLE FRONT SECTION
[75] Inventor: Stig I. Norlin, Kungshamn, Sweden
[73] Assignee: Saab-Scania Aktiebolag, Sweden
[21] Appl. No.: 324,627
[22] Filed: Nov. 24, 1981
[30] Foreign Application Priority Data
Nov. 24, 1980 [SE] Sweden ............................. 8008208
[51] Int. Cl.³ ............................................. B60R 21/00
[52] U.S. Cl. .................................. 296/188; 280/784;
293/132; 296/189; 296/194; 296/204
[58] Field of Search .............. 296/188, 189, 194, 204;
280/784; 293/132, 133

[56] References Cited
U.S. PATENT DOCUMENTS

| 2,636,750 | 4/1953 | Vahey | 280/797 |
|---|---|---|---|
| 2,636,774 | 4/1953 | Lindsay | 296/204 |
| 3,520,552 | 7/1970 | Graham | 280/784 |
| 3,655,237 | 4/1972 | Pitman | 296/188 |
| 3,819,224 | 6/1974 | Casey | 296/188 |
| 3,822,907 | 7/1974 | Appel | 280/784 |
| 3,827,525 | 8/1974 | Felzer | 236/189 |
| 3,940,176 | 2/1976 | Ito et al. | 296/188 |
| 3,971,588 | 7/1976 | Bauer | 280/784 |
| 4,355,844 | 10/1982 | Muzzarelli | 280/784 |

FOREIGN PATENT DOCUMENTS

| 307080 | 12/1968 | Sweden | 293/133 |
|---|---|---|---|
| 1449046 | 9/1976 | United Kingdom . | |
| 1487353 | 9/1977 | United Kingdom . | |

Primary Examiner—Bruce H. Stoner, Jr.
Assistant Examiner—John A. Carroll
Attorney, Agent, or Firm—Ostrolenk, Faber, Gerb & Soffen

[57] ABSTRACT

A motor vehicle front section has an impact-absorbing underside. A drive unit and/or at least one chassis member, attached to the front section, is fixed to a subframe. For greatest force absorption at extreme loads on the front section, e.g. in a vehicle collision, opposing abutment surfaces arranged in pairs in the subframe and supporting portions of the front structure essentially across the vehicle are urged towards each other to effect force transfer between the subframe and the supporting portions of the front structure.

21 Claims, 2 Drawing Figures

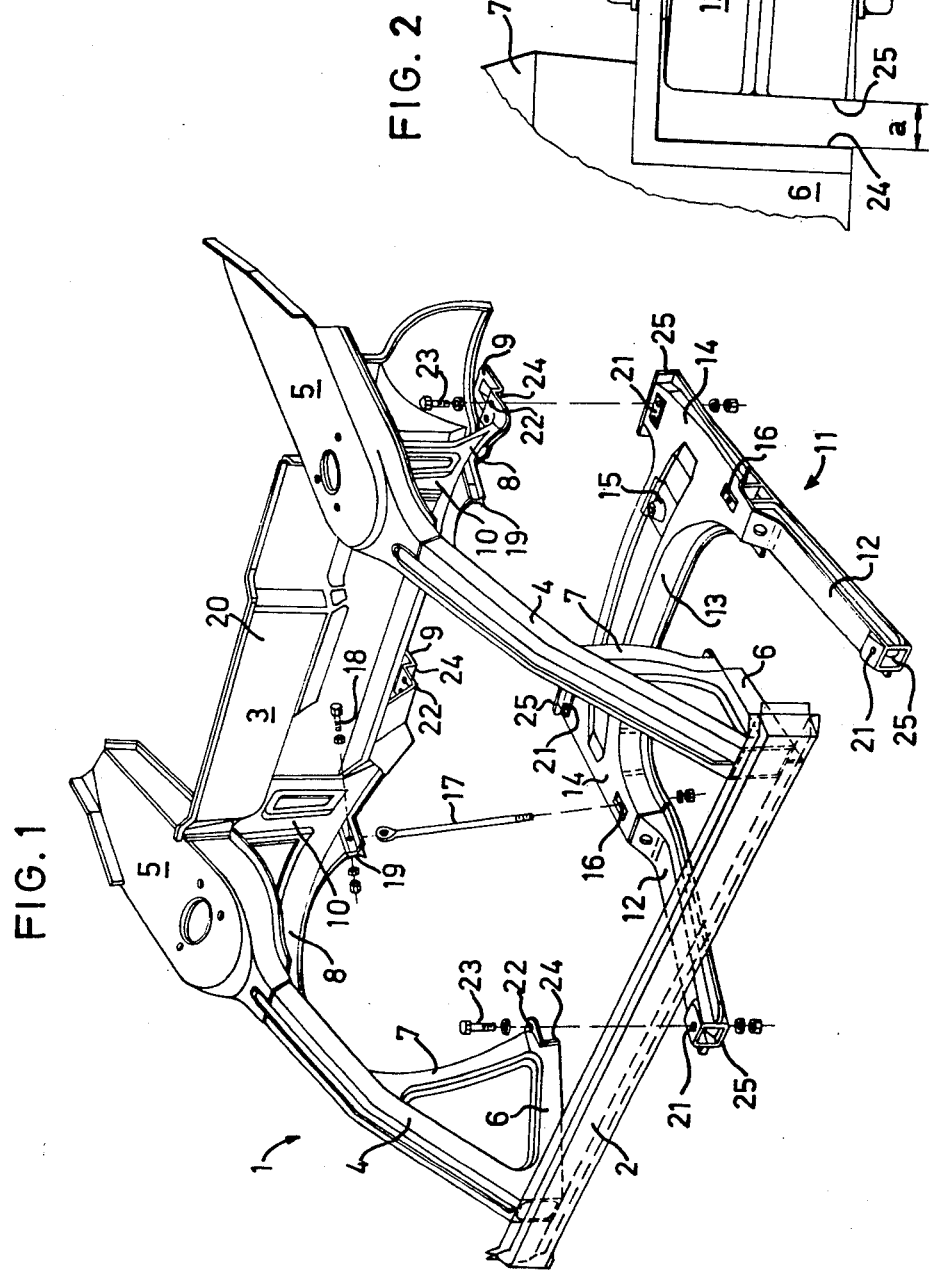

MOTOR VEHICLE FRONT SECTION

BACKGROUND OF THE INVENTION

The present invention relates to a front section in a motor vehicle, preferably a passenger automobile, with a front structure arranged therein for impact absorption, and including a subframe removably attached from the underside of the front section, there being attached to said subframe a drive unit and/or at least one chassis member mounted in the front section.

In vehicles equipped with frames which can be mounted from the underside, rational installation and removal of the respective vehicle drive unit from below is generally enabled. Such a frame, which can be designated "subframe", also enables good sound insulation between the drive unit and the vehicle body. To obtain said advantages, the subframe is usually attached to supporting portions of the front structure by means of simple bolted connections. The bolt strength then decides the possible force transfer between subframe and supporting portions of the front structure. In an accident, e.g. a head-on collision or a similar circumstance in which the front section of a vehicle is subjected to extreme forces, the subframe can only participate in force absorbing work as long as the bolted joints are intact. This means that supporting portions in the front structure must be dimensioned for absorbing forces without the participation of the subframe.

SUMMARY OF THE INVENTION

The present invention provides a front section as discussed above, which utilizes the subframe for the transfer and absorption of forces better than the solutions known so far. In these respects, the invention is essentially distinguished by the subframe being attached between stops in supporting portions of the front structure, the subframe and said supporting portions in the front structure being formed with mutually opposing abutment surfaces in pairs substantially transverse to the longitudinal direction of the vehicle, these surfaces being urged into mutual engagement for the action of extreme forces on the vehicle front section, and thereby taking care of force transfer between the supporting portions in the front structure and the subframe.

In the inventive embodiment of a front section, the subframe constitutes an integrated part of the front structure during the whole of the force-absorbing sequence occurring in a head-on collision with the vehicle. The strength of the bolts is thereby not decisive for the ability of the subframe to participate in force absorption. The fit of the subframe in the front structure enables the bolts attaching the subframe to be dimensioned according to other criteria instead, e.g. with relation to loads occurring during normal operation of the vehicle.

The supporting portions in the body of the vehicle front structure can furthermore be dimensioned on the basis of the stresses occurring when the subframe participates in collision force absorption. As a result the front structure can be made comparatively slender, thereby enabling the saving of weight without reducing the total force absorption ability of the front section in a head-on collision of the vehicle.

BRIEF DESCRIPTION OF THE DRAWINGS

Other distinguishing features of the invention will be apparent from the specification and claims and the following description of an embodiment exemplifying the invention. The description will be made with reference to the accompanying drawings, where FIG. 1 is a perspective view of a front structure with a subframe separated from its attachments in the front structure, and FIG. 2 illustrates, by means of a side view, how the subframe is attached at one end to the supporting portions of a front structure body.

DETAILED DESCRIPTION OF THE PREFERRED EMBODIMENT

A front structure 1, illustrated in FIG. 1, is intended for inclusion in the front section of a passenger automobile with a self-supporting or pontoon body. The front structure 1 is a frame structure which can be considered as comprising a body 20 and a subframe 11 attachable thereto. The body 20 includes and is substantially defined by two longitudinal side beams 4, a front bumper beam 2 and a rear bulkhead plate 3, the latter separating the passenger compartment of the automobile from its motor compartment in the front section in the assembled state of the front structure 1.

The two longitudinal side beams 4 are provided at their front ends with reinforcing struts; one substantially vertical strut 7 and the strut 6 connecting the lower end of the vertical strut 7 with the front end of the side beam 4. The struts 6,7 together with the supporting upper side beam 4 form a forward, triangular section which stabilizes the side beam 4 and counteracts buckling tendencies thereof for longitudinal stresses.

The respective longitudinal side beams 4 are rigidly connected at their forward ends with the bumper beam 2, and at the rear ends with the bulkhead plate 3 and a windshield pillar (not shown). At the rear attachment, each side beam 4 is connected to an attachment 5 for a member (not shown) included in the front wheel suspension of the vehicle.

The rear portion of the respective longitudinal side beams 4 is also formed with a dependent stabilizing section, which may be regarded as comprising an arcuate strut 8 and two vertical struts 10. Said struts 8,10 are rigidly attached to each other and to the upper longitudinal side beam 4. Via the dependent section 8,10, each side beam 4 is connected to the lower portion of the bulkhead plate 3 and to an attachment 9 mounted thereon, whereby the front structure 1 can be attached to a floor portion (not shown) in the vehicle.

The subframe 11 comprises two longitudinal side beams 12 and a cross beam 13 which is provided with T-shaped connections 14 for joining the rear ends of the side beams 12 to each other. The cross beam 13 with its T-shaped connections 14 to the respective side beams 12 is formed such that it has relatively large torsional stiffness about its longitudinal axis and about its vertical axis of symmetry. As a result of this, the subframe 11 is formed without any voluminous front cross beam.

The rear cross beam 13 carries attachments 15 for a housing (not shown) included in the vehicle steering gear. In the formed portion of the T-shaped connections 14 of the cross beam 13, there are arranged attachments 16 for connecting the lower end of the ties 17 transmitting tensional forces; only one of these ties being shown in FIG. 1. The bottom ends of said ties are threaded for connection to the subframe 11 via a washer and a nut.

The upper ends of the ties 17 are each attached to an attachment 19 formed on the dependent rear section 8,10 with the aid of a transverse bolt 18, two washers and a nut. In an assembled condition of the front structure 1, the ties 17 have the task of preventing forces along the subframe 11 from causing deflection of the side beams 12, expecially adjacent existing cross-sectional variations.

For assembly, the subframe 11 is adapted for fitting into and being attached between stops 24 in the body 10 of the front structure 1. Said stops 24 are formed in the lower rear portion of the respective forward triangular sections 6,7 as well as on the underside of the respective rear attachments 9. For such a fit, the side beams 12 of the subframe 11 are formed in the forward and rear ends with substantially vertical abutment surfaces 25 which are intended to coact for force absorption with corresponding surfaces on the stops 24 on the body 20 of the front structure 1.

The side beams 12 of the subframe 11 are furthermore formed with bolt holes 21 in respective forward and rear ends. Through these holes, the subframe 11 can be attached to the body 20 of the front structure 1 with the aid of a number of bolted joints 23, the bolts thereby engaging in attachment holes 22 in the attachments 9. The bolted joints 23, only two being shown in FIG. 1, are hereby preferably formed with rubber bushings (not shown) which prevent metal-to-metal contact between bolt and hole edge and thus act for sound insulation.

In a fitted state of the subframe 11, the abutment surfaces 24 in the body 20 of the front structure 1 form pairs with opposing abutment surfaces 25 on the side beams 12 in the subframe 11 while forming a given clearance a between them. Said clearance a, which is illustrated in FIG. 2, facilitates the fitting of the subframe 11 and also enables relative movement between the subframe 11 and the body 20 of the front structure 1. The gap, i.e. the so-called clearance a, is so adjusted that the bolted joints 23 in no case are exposed to risk of being broken by the action of collision forces before the surfaces 24,25 have been brought into engagement with each other. This signifies that the gap between each pair of coacting abutment surfaces 24,25 for non-sound insulating connection is about 3-5 mm, while the gap for sound-insulating connection may be up to 15 mm.

As previously mentioned, when assembling the front structure 1 in a vehicle, the rear attachments 9 shall be connected to the vehicle floor portion for transmission of force, and thus possible collision forces can be transferred to the doorsill beams (not shown) limiting lateral motion of floor portion.

In a head-on collision, the impact forces are transferred via the closed beam sections of the front structure 1 to the forward bolted joints 23 between the front structure 1 and the subframe 11.

The bolts 23 and their attachments thereby become deformed, but a complete rupture of the bolted joints does not occur before the abutment surfaces 24,25 on the front structure 1 and the subframe 11, respectively, have been brought into engagement with each other. Such deformation processes occur approximately simultaneously at the forward and the rear attachments of the subframe 11 to the front structure 1. The contact between said abutment surfaces 24,25 ensures that the subframe 11 is utilized in its entirety as a force-absorbing member during the collision process.

The embodiment described above is not to be regarded as limiting the invention, since the latter can be modified into a plurality of different embodiments within the scope of the concept and the following patent claims.

What I claim is:

1. An impact absorbing front section in a motor vehicle, the front section comprising:
    a front structure in the front section, the front structure being securable to the vehicle body,
    a first vertical abutment surface in the front structure extending in a direction substantially transverse to the length of the vehicle
    a subframe for carrying a drive unit of the vehicle,
    a second vertical abutment surface in the subframe for cooperating with the first vertical abutment surface, the second vertical abutment surface extending substantially parallel to the first vertical abutment surface, and
    securing means for securing and positioning the subframe with respect to the front structure so that the first vertical abutment surface and the second vertical abutment surface are spaced a predetermined distance apart, and so that impact on the front of the vehicle drives the first vertical abutment surface and the second vertical abutment surface into contact, the subframe being positioned by the securing means so that the subframe serves to oppose collapse of the front structure under impact after the first vertical abutment surface and the second vertical abutment surface are driven into contact.

2. The front section of claim 1, in which the front structure comprises two longitudinal side beams, a front bumper beam connected to the longitudinal side beams and a rear bulkhead plate connected to the longitudinal side beams.

3. A front section as claimed in claim 1, in which the predetermined distance is between 3 and 15 mm.

4. The front section of claim 1 in which the front structure includes a plurality of first abutment surfaces, and the subframe includes a plurality of second abutment surfaces equal in number to the plurality of first abutment surfaces, each first abutment surface cooperating with one second abutment surface.

5. The front section of claim 4 in which the front structure consists of two front vertical abutment surfaces and two rear vertical abutment surfaces.

6. The front section of claim 4 in which the subframe comprises two longitudinal side beams, the side beams having a front end portion and a rear end portion, and a cross beam connecting the two side beams.

7. The front section of claim 6 in which the second abutment surfaces are formed in the front end portion and rear end portion of the side beam.

8. The front section of claim 6 in which the end portions of the side beams comprise attachment points for the securing means.

9. The front section of claim 1 in which the second abutment surface is disposed, with respect to the length of the vehicle, behind the first abutment surface with which it cooperates.

10. The front section of claim 1 in which the second abutment surface is disposed, with respect to the length of the vehicle, in front of the first abutment surface with which it cooperates.

11. The front section of claim 1 further comprising sound isolating means cooperating with the securing means, for securing the subframe to the front structure in a sound isolating manner.

12. The front section of claim 1 in which the securing means serves to removably secure the subframe to the front structure.

13. The front section of claim 12 in which the subframe may be removed from the underside of the vehicle.

14. The front section of claim 1 in which the front support comprises two longitudinal side beams, a front bumper beam connected to the side beams and a rear bulkhead plate connected to the side beams.

15. The front section of claim 1 in which the securing means comprises a plurality of bolted joints.

16. The front section of claim 1 in which the securing means comprises a number of bolted joints that connect the subframe to the front structure, the size of the predetermined distance during normal driving conditions being determined by the configuration of the bolted joints.

17. A front section in a vehicle, preferably a car, having an impact absorption front structure arranged therein, said front structure having supporting portions carrying stops and said front structure also including a subframe carrying at least the vehicle engine, said subframe being secured at the underside of the front section by means of attachment means to said stops in said supporting portions of the front structure;

said subframe comprising two longitudinal side beams and at least one cross beam, said beam forming a mountable unit;

the ends of said side beams and the supporting portions of said front structure being formed with abutment surfaces, opposed to each other in pairs substantially transverse to the longitudinal direction of the vehicle, there being provided between cooperating abutment surfaces on the subframe and on supporting portions of the front structure a predetermined clearance that during normal use of the vehicle allows relative movement between the subframe and the front structure, and that during the action of extreme forces on the vehicle front section cease to exist because the abutment surfaces are forced against each other, thereby establishing a force-transmitting connection before the attachment means of the subframe becomes deformed.

18. A front section as claimed in claim 17, wherein the ends of the sidebeams in the subframe are supported against two front and two rear stops in the front structure, which substantially comprise two longitudinal side beams, a front bumper beam and a rear bulkhead plate.

19. A frame section as claimed in claim 17, wherein the size of the predetermined clearance arranged for normal driving conditions is dependent on the implementation of a number of bolted joints connecting the subframes with supporting portions of the front structure.

20. A front section as claimed in claim 19, wherein the end portions of the side beams in the subframe also constitute attachment points for bolted joints.

21. A front section as claimed in claim 19, wherein the predetermined clearance is between 3 and 15 mm.

* * * * *